(12) United States Patent
Furutani et al.

(10) Patent No.: US 7,393,884 B2
(45) Date of Patent: Jul. 1, 2008

(54) PIGMENT INK COMPOSITION

(75) Inventors: Takahiro Furutani, Suita (JP); Nagayuki Takao, Muko (JP)

(73) Assignee: Hitachi Maxwell, Ltd., Ibaraki-shi (JP)

( * ) Notice: Subject to any disclaimer, the term of this patent is extended or adjusted under 35 U.S.C. 154(b) by 357 days.

(21) Appl. No.: 10/518,452

(22) PCT Filed: Jun. 20, 2003

(86) PCT No.: PCT/JP03/07840

§ 371 (c)(1),
(2), (4) Date: Dec. 20, 2004

(87) PCT Pub. No.: WO04/000956

PCT Pub. Date: Dec. 31, 2003

(65) Prior Publication Data

US 2005/0203209 A1 Sep. 15, 2005

(30) Foreign Application Priority Data

Jun. 20, 2002 (JP) ............................. 2002-179470

(51) Int. Cl.
*C09D 11/00* (2006.01)

(52) U.S. Cl. .................. 523/160; 523/161; 524/555; 106/31.6; 106/31.85; 106/31.86

(58) Field of Classification Search .............. 523/160, 523/161; 524/555; 106/31.6, 31.85, 31.86
See application file for complete search history.

(56) References Cited

U.S. PATENT DOCUMENTS

| 5,907,333 | A | * | 5/1999 | Patil et al. ................... 347/20 |
| 5,954,866 | A | * | 9/1999 | Ohta et al. ............... 106/31.89 |
| 5,980,624 | A | * | 11/1999 | Ichikawa ................. 106/31.58 |
| 5,981,113 | A | | 11/1999 | Christian |
| 6,245,832 | B1 | * | 6/2001 | Suzuki et al. ............... 523/160 |
| 6,251,175 | B1 | * | 6/2001 | Zhu et al. ................ 106/31.58 |
| 6,627,364 | B2 | * | 9/2003 | Kiguchi et al. ................. 430/7 |
| 7,156,909 | B2 | * | 1/2007 | Oyanagi et al. .......... 106/31.58 |
| 2001/0000253 | A1 | * | 4/2001 | Matzinger ................... 523/160 |
| 2005/0272833 | A1 | * | 12/2005 | Doshi ........................ 523/160 |

FOREIGN PATENT DOCUMENTS

| CN | 1240466 A | | 1/2000 |
| EP | 1394207 A1 | | 3/2004 |
| JP | 7-109431 A | | 4/1995 |
| JP | 10-110130 A | | 4/1998 |
| JP | 2000-38533 A | | 2/2000 |
| JP | 2001-192595 A | * | 7/2001 |
| JP | 2001-220527 A | | 8/2001 |
| JP | 2001-329193 A | | 11/2001 |
| WO | WO-98/27171 A1 | | 6/1998 |
| WO | WO 02/055619 A1 | * | 7/2002 |

OTHER PUBLICATIONS

Machine Translation of JP 07-109431 A (1995).*
Machine Translation of JP 2001-192595 A (2001).*
Lewis, Sr., Richard J.; Hawley's Condensed Chemical Dictionary 13th Ed., John Wily & Sons, New York, 1997 (pp. 469-470).*

* cited by examiner

*Primary Examiner*—Bernard Lipman
(74) *Attorney, Agent, or Firm*—Birch, Stewart, Kolasch & Birch, LLP

(57) ABSTRACT

A pigmented ink composition comprising a pigment, a resin having an acidic group and an organic solvent having a boiling point of at least 150° C. which is present in an amount of from 50 to 90% by weight based on the whole weight of the ink composition. When this ink composition is subjected to an printed layer-sliding test in which the ink composition is applied on a cationically treated printing medium with a #4 bar coater (available from TOYO SEIKI KOGYO CO., LTD.) and dried and then the printed surface is slid with a cloth on which a weight of 50 g is placed, the printed record is not grazed. This ink composition contains the pigment with a small dispersion particle size and has good water resistance, can be printed on a plain paper sheet without cockling, and suffers from no grazing of printed records when the ink composition is printed on a cationically treated paper sheet.

6 Claims, No Drawings

PIGMENT INK COMPOSITION

FIELD OF THE INVENTION

The present invention relates to a pigmented ink composition comprising a pigment, a resin, and an organic solvent. In particular, the present invention relates to a pigmented ink composition for ink-jet printing systems.

BACKGROUND ART

In an ink-jet printing system, a liquid ink is ejected from a nozzle towards a printing medium using a pressure, heat or an electric field as a driving source to print the printing medium. The ink-jet printing system can be used with a low running cost and form high quality images. Accordingly, in these years, the ink-jet printing system has been quickly spreading not only as an office printing system but also domestic printing system.

As inks for ink-jet printing, aqueous dye inks, which comprise water-soluble dyes dissolved in aqueous media, are used since they have high coloring properties and cause less clogging of printer head orifices. However, the aqueous dye inks have some drawbacks such as low water-resistance, insufficient durability, etc.

Recently, large-size ink-jet printers, which can accommodate to the A-0 size sheet, have been developed and increasingly used outdoor applications for printing exterior posters. In addition, with the popularization of digital cameras, the ink-jet printing is used in applications where printed materials are stored for a long time. Under such circumstances, pigmented inks with good water resistance and weather resistance are being vigorously developed.

However, the aqueous pigment inks comprising water or an aqueous medium as a solvent are not suitable for printing posters since plain paper sheets are cockled (i.e. waving after drying) when they are printed with such aqueous pigment inks.

Oil-based pigmented inks comprising aliphatic hydrocarbons or alcohols as solvents (for example, inks disclosed in JP-A-2000-38533, JP-A-2001-220527 and JP-A-2001-329193) cause less cockling. However, when they are printed on a cationically treated printing media (in general, gloss paper sheets), printed records tend to be grazed. For example, if a number of sheets are continuously printed, the printed records are easily grazed, when the second and subsequent printed sheets are laminated on the previous sheet for several seconds, or the printed records are touched with a hand after printing.

SUMMARY OF THE INVENTION

An object of the present invention is to provide a pigmented ink composition having good anti-grazing properties, in particular, a pigmented ink composition for ink-jet printers, which contains a pigment with a small dispersion particle size and has good water resistance, can be printed on a plain paper sheet without cockling, and suffers from no grazing of printed records when the ink composition is printed on a cationically treated paper sheet.

It has been found that when a pigmented ink composition contains a specific resin and a specific organic solvent in a specified amount, the pigment has a small dispersion particle size, and the ink composition has good water resistance, it can be printed on a plain paper sheet without cockling and furthermore it has good anti-grazing properties such that it suffers from no grazing of printed records when it is printed on a cationically treated paper sheet.

The present invention has been completed based on the above finding.

Accordingly, the present invention provides a pigmented ink composition comprising a pigment, a resin having an acidic group and an organic solvent having a boiling point of at least 150° C. which is present in an amount of from 50 to 90% by weight based on the whole weight of the ink composition.

With the pigmented ink composition of the present invention, when the ink composition is subjected to an printed layer-sliding test in which the ink composition is applied on a cationically treated printing medium with a #4 bar coater (available from TOYO SEIKI KOGYO CO., LTD.) and dried and then the printed surface is slid with a cloth on which a weight of 50 g is placed, the printed record is not grazed, that is, the printed record has good anti-grazing properties.

In concrete, the printed layer-sliding test is carried out as follows:

A pigmented ink composition is applied on a cationically treated printing medium with a #4 bar coater (available from TOYO SEIKI KOGYO CO., LTD.) and dried for 10 minutes in an atmosphere kept at a temperature of 20 to 25° C. and a humidity of 40 to 60%, and then the printed layer of the ink composition is slid ten times with a cloth, on which a weight of 50 g (a contact area of 3.1 cm$^2$) is placed at an interval of 3 seconds. Then, the grazing of the printed layer is evaluated.

An example of a cationically treated printing medium is a gloss paper sheet for ink-jet printing with aqueous dyes. Gloss paper sheets are commercially available from Hitachi Maxell, Epson, Canon, Konica Minolta, etc.

The ink composition is preferably applied with a #4 coater to a thickness of 5 to 10 μm, and the thickness of the printed layer after being dried for 10 minutes is preferably from 0.09 to 1.8 μm.

Examples of the cloth to be slid on the coating layer of the ink composition include BEMCOTTON, TECHNICLUE, KIM WIPE, KIM WIPER, CHEM DRY, KIM TEC, KIM TECS, KIM TOWEL (all available from ASONE), cloths of natural fibers such as silk, cotton, etc., cloths of synthetic fibers such as polyester fiber, etc.

The pigmented ink composition of the present invention can withstand the above printed layer-sliding test. That is, the coating layer is not grazed in the sliding layer-sliding test and has good anti-grazing properties. Therefore, when the pigmented ink composition of the present invention is printed on a cationically treated printing medium with an ink-jet printer, the anti-grazing properties of the printed material or record are greatly improved. For example, when the second and subsequent printed sheets are laminated on the previous sheet for several seconds, or the printed records are touched with a hand after printing, the printed records are not grazed.

DETAILED DESCRIPTION OF THE INVENTION

In the present invention, the pigment may be an inorganic pigment, an organic pigment or a dye.

Examples of the inorganic pigment include carbon black, titanium oxide, Chinese white (zinc flower), zinc oxide, lithopone, iron oxide, aluminum oxide, silicon dioxide, kaolinite, montmorillonite, talc, barium sulfate, calcium carbonate, silica, alumina, cadmium red, red oxide, molybdenum red, chrome vermilion, molybdate orange, chrome yellow, cadmium yellow, yellow iron oxide, titanium yellow, chromium oxide, viridian, cobalt green, titanium cobalt green, cobalt chrome green, Armenian blue, ultramarine blue pigment, Paris blue, cobalt blue, cerulean blue, manganese violet, cobalt violet, mica, etc.

Examples of the organic pigment include azo pigments, azomethine pigments, polyazo pigments, phthalocyanine pigments, quinacridone pigments, anthraquinone pigments, indigo pigments, thioindigo pigments, quinophthalone pigments, benzimidazolone pigments, isoindoline pigments, isoindolinone pigments, etc.

Examples of the dye include azo dyes, anthraquinone dyes, indigo dyes, phthalocyanine dyes, carbonyl dyes, quinonimine dyes, methine dyes, quinoline dyes, nitro dyes, etc. Among them, disperse dyes are particularly preferred.

The amount of the pigment is preferably from 0.1 to 20% by weight based on the whole weight of the ink composition. When the amount of the pigment is less than 0.1% by weight, the properties of the pigment may not be sufficiently exerted. When the amount of the pigment exceeds 20% by weight, the stability of the dispersion or the anti-grazing properties of the printed records may not be sufficiently improved.

In the present invention, the resins having the acidic group include a wide variety of resins such as acrylic, polyester, polyurethane, epoxy and amino resins having an acidic group such as a carboxyl group, a sulfonic acid group, a phosphonic acid group, etc. These resins may be used independently or as a mixture of two or more of them. Among them, the acrylic resins are preferable in view of the easiness of synthesis and grafting, and the easiness of the introduction of the acidic group. Furthermore, the resin having the acidic group is used as a dispersant of the pigment or as a resin other than a dispersant. In such a case, the resin having the acidic group may be used in combination with a common dispersant and/or an additional resin.

The resin having the acidic group not only improves the dispersion particle size of the pigment or the water resistance of the ink composition but also has good effects on the anti-grazing properties of the printed records printed on the cationically treated printing media. With the gloss papers for ink-jet printing of aqueous dyes, an ink-receptive layer is designed to be cationic to increase the fixing and water resistance of anionic dyes. For example, cationic resins or cationic alumina fillers are used to make the gloss papers cationic. When the anionic resin having the acidic group is used, the adhesion of the resin to the cationic ink-receptive layer is enhanced so that the anti-grazing properties of the printed records are improved.

According to the present invention, the resin having the acidic group preferably has an acid value of 10 to 300 mg-KOH/g, more preferably from 15 to 200 mg-KOH/g, most preferably 30 to 150 mg-KOH/g. When the acid value is less than 10 mg-KOH/g, the above effects of the present invention may not be satisfactorily achieved. When the acid value exceeds 300 mg-KOH/g, the improvement of the above effects may saturate, and in some cases, the viscosity of the ink composition may increase.

The resin having the acidic group preferably has a weight average molecular weight of $1 \times 10^4$ to $3 \times 10^5$, more preferably from $2 \times 10^4$ to $1 \times 10^5$. When the weight average molecular weight of the resin is less than $1 \times 10^4$, it is too small so that the printed records having sufficient strength may not be formed. When the weight average molecular weight of the resin exceeds $3 \times 10^5$, the viscosity of the ink composition tends to increase. Furthermore, the resin having the acidic group preferably has a molecular weight distribution of 1.5 to 10, in particular 2 to 5. When the resin having the acidic group has an adequate molecular weight distribution, the printed records formed from the ink composition of the present invention exhibits the sufficient anti-grazing properties in the wide range of circumstances where the printed materials are used.

Herein, the weight average molecular weight of the resin having the acidic group means a polystyrene-converted molecular weight measured by gel permeation chromatography.

According to the present invention, the resin having the acidic group is preferably a resin having an ether bond. When the resin has the ether bond, it has improved affinity with the cationically treated printing media and thus the anti-grazing properties of the printed records can be further improved. Alternatively, the resin is preferably a water-insoluble resin having a hydrophobic group, since the water resistance of the printed records is further improved due to the insolubility of the resin having the hydrophobic group in water. Furthermore, the resin preferably has a polar group such as a hydroxyl group or an amino group. When the resin has the polar group, it has better affinity to the organic solvent or the paper sheet to be printed.

The above resin used in the present invention may be easily synthesized by copolymerizing a monomer having an acidic group (hereinafter referred to as "anionic monomer"), a monomer having an ether bond, a monomer having a hydrophobic monomer and optionally a monomer having a polar group by a conventional polymerization method. Copolymer resins comprising those monomers are commercially available.

Examples of the anionic monomer include monomers having a carboxyl group such as acrylic acid, methacrylic acid, crotonic acid, ethacrylic acid, propylacrylic acid, isopropylacrylic acid, itaconic acid, fumaric acid, acryloyloxyethyl phthalate, acryloyloxyethyl succinate, 2-methacryloyloxyethylsuccinic acid, 2-methacryloyloxyethyl-hexahydrophthalic acid, 2-acryloyloxyethylsuccinic acid, 2-acryloyloxyethylphthalic acid, etc.; monomers having a sulfonic acid group such as 2-sulfonylethyl acrylate, 2-sulfonylethyl methacrylate, butylacrylamidesulfonic acid, etc.; and monomers having a phosphonic acid group such as 2-phosphonylethyl methacrylate, 2-phosphonylethylacrylate, etc. Among them, the monomer shaving a carboxyl group are preferable.

Preferable examples of the monomers having an ether bond include monomers known as polyether-based acromonomers such as "PME-200", "PME-400", "PME-1000", "AME-400", "PP-500", "PP-800", "PP-1000" and "PE-350" (all available from NOF Corporation); and "AMP-10G" and "MP-60G" (both available from Shin-Nakamura Chemical Co., Ltd.).

Examples of the monomers having a hydrophobic group include acrylates and methacrylate such as methyl acrylate, ethyl acrylate, isopropyl acrylate, n-propyl acrylate, n-butyl acrylate, tert-butyl acrylate, benzyl acrylate, methyl methacrylate, ethyl methacrylate, isopropyl methacrylate, n-propyl methacrylate, n-butyl methacrylate, isobutyl methacrylate, tert-butyl methacrylate, tridecyl methacrylate, benzyl methacrylate, 2-ethylhexyl acrylate, 2-ethylhexyl methacrylate, octyl acrylate, octyl methacrylate, lauryl acrylate, lauryl methacrylate, cetyl acrylate, cetyl methacrylate, stearyl acrylate, stearyl methacrylate, behenyl acrylate, behenyl methacrylate, etc.; styrene monomers such as styrene, α-methylstyrene, o-methylstyrene, m-methylstyrene, p-methylstyrene, p-tert-butylstyrene, etc.; itaconates such as benzyl itaconate, etc.; maleates such as dimethyl maleate, etc.; fumarates such as dimethyl fumarate, etc.; vinyl acetate; and the like.

Examples of the monomers having a polar group include monomers having a hydroxyl group such as 2-hydroxyethyl acrylate, 2-hydroxyethyl methacrylate, hydroxypropyl acrylate, hydroxypropylmethacrylate, etc.; monomers having a primary amino group such as aminoethyl acrylate, aminopropyl acrylate, aminoethyl methacrylate, aminoproyl methacrylate, etc.; monomers having a secondary amino group such as methylaminoethyl acrylate, methylaminopropyl acrylate, ethylaminoethyl acrylate, ethylaminopropyl acrylate, methylaminoethyl methacrylate, methylaminopropyl methacrylate, ethylaminoethyl methacrylate, ethylaminopropyl methacrylate, etc.; monomers having a tertiary amino group such as dimethylaminoethyl acrylate, diethylaminoethyl acrylate, dimethylaminopropyl acrylate, diethylaminopropyl acrylate, dimethylaminoethyl methacrylate, diethylaminoethyl methacrylate, dimethylaminopropyl methacrylate, diethylaminopropyl methacrylate, etc.; monomers having an amide group such as acrylamide, methacrylamide, dimethylacrylamide, dimethylaminopropylacrylamide, isopropylacrylamide, diethylacrylamide, etc.; cyclic monomers such as acryloylmorpholine, vinylpyrrolidone, vinylpyridine, etc.; and the like.

In the present invention, the amount of the resin having the acidic group is preferably from 0.5 to 30% by weight, more preferably from 1 to 20% by weight, most preferably from 1.5 to 10% by weight, based on the whole weight of the ink composition. When the amount of the resin is less than 0.5% by weight, the above effects achieved by this resin may not be attained. When the amount of the resin exceeds 30% by weight, the improvement of the effects achieved by this resin may saturate, and the viscosity of the ink composition tends to increase.

The amount of the resin having the acidic group based on the weight of the pigment is preferably from 10 to 300% by weight, more preferably from 20 to 200% by weight, most preferably from 50 to 150% by weight. When this amount is less than 10% by weight, the proportion of the pigment is too high so that the sufficient fixing of the ink composition may not be attained. When this amount exceeds 300% by weight, the improvement of the effects achieved by this resin may saturate, and the viscosity of the ink composition tends to increase.

In the present invention, the organic solvent has a boiling point of at least 150° C. If an organic solvent having a boiling point of lower than 150° C. is used, the ink composition is dried on the head of an ink jet printer so that the head tends to be clogged. The organic solvent having a boiling point of at least 150° C. is preferably a polar solvent, more preferably an ether solvent. The ether solvent has good affinity with the cationically treated printing media and significantly improves the anti-grazing properties of the printed records, since it has a high polarity.

The ether solvent is preferably a monoalkyl ether monoalkykl ester derivative or a dialkyl ester derivative of (poly)alkylene glycol. Examples of these compounds include ethylene glycol monoalkyl ether monoalkyl ester, diethylene glycol monoalkyl ether monoalkyl ester, triethylene glycol monoalkyl ether monoalkyl ester, propylene glycol monoalkyl ether monoalkyl ester, dipropylene glycol monoalkyl ether monoalkyl ester, tripropylene glycol monoalkyl ether monoalkyl ester, ethylene glycol dialkyl ester, diethylene glycol dialkyl ester, triethylene glycol dialkyl ester, propylene glycol dialkyl ester, dipropyleneglycol dialkyl ester, tripropylene glycol dialkyl ester, etc. They may be used independently or as a mixture of two or more of them.

Specific examples of these compounds include diethylene glycol monoethyl ether monomethyl ester, diethylene glycol monobutyl ether monomethyl ester, dipropylene glycol monoethyl ether monomethyl ester, diethylene glycol monobutyl ether monomethyl ester, diethylene glycol monoethyl ether monoethyl ester, diethylene glycol monoethyl ether monobutyl ester, diethylene glycol dimethyl ester, triethylene glycol monoethyl ether monomethyl ester, triethylene glycol monobutyl ether monomethyl ester, triethylene glycol dimethyl ester, tetraethylene glycol monoethyl ether monomethyl ester, tetraethylene glycol monobutyl ether monomethyl ester, etc.

These compounds have at least one polar group (an ester group and an ether group) and also at least one hydrophobic group (an alkyl group) and thus they have a good fixing property to any printing media and good water resistance. These two properties may easily be adjusted by selecting the number of the polar groups and the number of the carbon atoms in the hydrophobic group. The polar group contributes to the prevention of cockling when the ink composition is printed on a plain paper sheet.

The organic solvent having a boiling point of at least 150° C. is used in an amount of 50 to 95% by weight, particularly 60 to 90% by weight, based on the whole weight of the ink composition. When the amount of the organic solvent is too small or too large, the effects of the present invention may not be attained. The organic solvent having a boiling point of at least 150° C. may be used in combination with other common organic solvent such as an aliphatic hydrocarbon. In this case, the total amount of the organic solvent having a boiling point of at least 150° C. and the other solvent is preferably in the above range. The solid content in the ink composition is preferably adjusted in a range from 0.5 to 20% by weight, particularly from 1.5 to 15% by weight by selecting the amount of the organic solvent.

The ink composition of the present invention comprises the pigment, the resin having the acidic group and the organic solvent having a boiling point of at least 150° C. as the essential components. The ink composition may optionally contain common additives such as surfactants, other resins, surface-modifiers, leveling agents, defoaming agents, antioxidants, pH regulators, charging agents, disinfectants, preservatives, charge-adjusters, wetting agents, anti-skinning agents, perfumes, deodorants or deodrizers, pigment derivatives, etc.

The pigmented ink composition of the present invention may be prepared by mixing and dispersing the components using a barrel-driving type mills (e.g. ball mill, centrifugal mill, planetary mill, etc.), high speed rotation mills (e.g. sand mill, etc.), medium-agitation mills (e.g. agitated vessel mill, etc.), simple dispersing equipment (e.g. disper, etc.), and the like.

The pigmented ink composition of the present invention, in particular, one for ink-jet printing systems, preferably has a surface tension at 20° C. of at least 25 mN/m, more preferably at least 27 mN/m, and preferably a viscosity at 20° C. of 2 to 30 cp, more preferably 3 to 15 cp. When the ink composition has a surface tension or a viscosity outside the above range, it may not be stably printed on a printing medium.

The pigment usually has a dispersion average particle size of 0.01 to 0.5 μm, preferably 0.05 to 0.3 μm, more preferably 0.06 to 0.2 μm. When the average particle size of the pigment is less than 0.01 μm, the dispersion of the ink composition may become unstable. When the average particle size of the pigment exceeds 0.5 μm, the pigment tends to clog the head.

The pigmented ink composition of the present invention can be used in any type of printing systems such as ink-jet printing, offset printing, gravure printing and thermal transfer printing systems and the like. Among them, the ink composition of the present invention is preferably used for ink-jet printing. That is, when the ink composition of the present invention is used with an ink-jet printer, the above effects of the present invention can be well attained.

EXAMPLES

Hereinafter, the present invention will be illustrated by the following examples, in which "parts" means "parts by weight" unless otherwise indicated.

Example 1

In a 100 cc plastic bottle, 4 parts of a copper phthalocyanine blue pigment ("FASTOGEN BLUE GNPS" available from Dainippon Ink and Chemicals Incorporated), 4 parts of Dispersant A [copolymer of styrene/methacrylic acid/butyl acrylate/butyl methacrylate/polyether macromonomer ("PME 400" available from NOF Corporation) (weight ratio of 20/10/30/30/10), acid value: 65 mg-KOH/g, weight average molecular weight: $6.0 \times 10^4$, molecular weight dispersion: 3.2], 12 parts of diethylene glycol monobutyl ether monomethyl ester (boiling point: 247° C.) as an organic solvent and 100 parts of zirconia beads having a diameter of 3 mm were weighed and charged, and the mixture was dispersed for 2 hours with a paint shaker (available from TOYO SEIKI KOGYO CO., LTD.).

After dispersing, the mixture was diluted with diethylene glycol monobutyl ether monomethyl ester to obtain Pigmented Ink Composition A containing 5% by weight of the pigment and 5% by weight of Dispersant A.

Example 2

Pigmented Ink Composition B of this Example was prepared in the same manner as in Example 1 except that Dispersant A was changed to 4 parts of Dispersant B [styrene/acrylic acid/butyl acrylate/butyl methacrylate/PME 400 copolymer (weight ratio of 20/10/30/30/10), acid value: 77 mg-KOH/g, weight average molecular weight: $5.4 \times 10^4$, molecular weight dispersion: 3.0]. Ink Composition B contained 5% by weight of the pigment and 5% by weight of Dispersant B.

Example 3

Pigmented Ink Composition C of this Example was prepared in the same manner as in Example 1 except that Dispersant A was changed to 4 parts of Dispersant C [styrene/2-acryloyloxyethylsuccinic acid/butyl acrylate/butyl methacrylate/PME 400 copolymer (weight ratio of 20/10/30/30/10), acid value: 24 mg-KOH/g, weight average molecular weight: $6.5 \times 10^4$, molecular weight dispersion: 3.3]. Ink Composition C contained 5% by weight of the pigment and 5% by weight of Dispersant C.

Example 4

Pigmented Ink Composition D of this Example was prepared in the same manner as in Example 1 except that Dispersant A was changed to 4 parts of Dispersant D [lauryl methacrylate/methacrylic acid/butyl acrylate/butyl methacrylate/PME 400 copolymer (weight ratio of 20/10/30/30/10), acid value: 65 mg-KOH/g, weight average molecular weight: $6.7 \times 10^4$, molecular weight dispersion: 3.5]. Ink Composition D contained 5% by weight of the pigment and 5% by weight of Dispersant D.

Example 5

Pigmented Ink Composition E of this Example was prepared in the same manner as in Example 1 except that triethylene glycol dimethyl ester (boiling point: 270° C.) was used in place of diethylene glycol monobutyl ether monomethyl ester. Ink Composition E contained 5% by weight of the pigment and 5% by weight of Dispersant A.

Comparative Example 1

Pigmented Ink Composition F of this Comparative Example was prepared in the same manner as in Example 1 except that Dispersant A was changed to 4 parts of Dispersant E [SOLSPER 13940 available from Avecia, polyester resin, acid value: 8 mg-KOH/g, weight average molecular weight: $7.3 \times 10^3$, molecular weight dispersion: 1.2], and diethylene glycol monobutyl ether monomethyl ester was changed to liquid paraffin (MOLESCO WHITE P-70 available from MATSUMOTO SEKIYU KENKYUSHO). Ink Composition F contained 5% by weight of the pigment and 5% by weight of Dispersant E.

Comparative Example 2

Pigmented Ink Composition G of this Comparative Example was prepared in the same manner as in Example 1 except that Dispersant A was changed to 4 parts of Dispersant F [styrene/butyl acrylate/butyl methacrylate/PME 400 copolymer (weight ratio of 20/40/30/10), acid value: 0 mg-KOH/g, weight average molecular weight: $6.3 \times 10^4$, molecular weight dispersion: 3.2]. Ink Composition G contained 5% by weight of the pigment and 5% by weight of Dispersant F.

Reference Example 1

Pigmented Ink Composition H of this Reference Example was prepared in the same manner as in Example 1 except that Dispersant A was changed to 4 parts of Dispersant G [styrene/methacrylic acid/butyl acrylate/butyl methacrylate/PME 400 copolymer (weight ratio of 20/10/30/30/10), acid value: 65 mg-KOH/g, weight average molecular weight: $4.0 \times 10^3$, molecular weight dispersion: 1.4]. Ink Composition H contained 5% by weight of the pigment and 5% by weight of Dispersant G.

Reference Example 2

Pigmented Ink Composition I of this Reference Example was prepared in the same manner as in Example 1 except that the amount of Dispersant A was changed from 4 parts to 0.32 part. Ink Composition I contained 5% by weight of the pigment and 0.4% by weight of Dispersant G.

With Ink Compositions A to E of Examples 1-5, Ink Compositions F and G of Comparative Examples 1 and 2, and Ink Compositions H and I of Reference Examples 1 and 2, a dispersion average particle size of the pigment, water resistance and cockling were measured or evaluated by the following methods:

Dispersion Average Particle Size:

A dispersion average particle size of pigment particles in the pigmented ink composition was measured using a laser Doppler particle size analyzer (N-4-PLUS available from Coulter).

Printed Layer-sliding Test:

A pigmented ink composition was coated on a gloss paper sheet (SUPER PHOTO GLOSS PAPER available from Hitachi Maxell) with a #4 bar coater (available from TOYO SEIKI KOGYO CO., LTD.) and dried for 10 minutes in an atmosphere kept at a temperature of 20 to 25° C. and a humidity of 40 to 60%, and then the printed layer of the ink composition was slid ten times with a cloth (BEMCOTTON available from ASONE), on which a weight of 50 g (a contact area of 3.1 cm$^2$) was placed at an interval of 3 seconds. Then, the grazing of the printed layer is visually evaluated. When no grazing of the printed layer was caused, the ink composition was ranked "A", while grazing was caused, the ink composition was ranked "B".

Water Resistance:

A pigmented ink composition was coated on a plain paper sheet (available from XEROX) using #4 wire bar (available from TOYO SEIKI KOGYO CO., LTD.) and then dipped in ion-exchanged water for 1 (one) hour. When no blur occurred, the ink composition was ranked "A", while when blur occurred, the ink composition was ranked "B".

Cockling:

A pigmented ink composition was coated on a plain paper sheet (available from XEROX) using #4 wire bar (available from TOYO SEIKI KOGYO CO., LTD.) and then dried. When the paper sheet was no cockled, the ink composition was ranked "A", while when the paper sheet was cockled, the ink composition was ranked "B".

Anti-grazing:

Using an ink-jet printer (MJ-510C available from EPSON), a gradation test pattern (100, 80, 60, 40 and 20) was continuously printed on five sheets of gloss paper (SUPER PHOTO GLOSS PAPER available from Hitachi Maxell) with a pigmented ink composition at a temperature of 20 to 25° C. and a humidity of 40 to 60%.

When no grazing of the printed pattern was caused by discharging or piling, the ink composition was ranked "A", while grazing was caused, the ink composition was ranked "B". The presence of grazing was visually evaluated.

TABLE 1

| | Pigmented ink composition | Dispersion average particle size (nm) | Water resistance | Cockling | Anti-grazing | Sliding test |
|---|---|---|---|---|---|---|
| Ex. 1 | A | 103 | A | A | A | A |
| Ex. 2 | B | 105 | A | A | A | A |
| Ex. 3 | C | 108 | A | A | A | A |
| Ex. 4 | D | 102 | A | A | A | A |
| Ex. 5 | E | 106 | A | A | A | A |
| C. Ex. 1 | F | 150 | A | A | B | B |
| C. Ex. 2 | G | 220 | A | A | B | B |
| Ref. Ex. 1 | H | 190 | A | A | B | B |
| Ref. Ex. 2 | I | 200 | A | A | B | B |

As can be seen from the results in Table 1, in Pigmented Ink Compositions A to E of Examples 1 to 5 according to the present invention, the dispersion average particle size of the pigment was small, no grazing occurred in the printed layer-sliding test, and the printed layer was not peeled from the printing medium. Furthermore, they had good water resistance, caused no cockling when they were printed on the plain paper sheet, and had good anti-grazing properties when they were printed on the gloss paper sheet. That is, they satisfied all the properties.

In contrast, in Pigmented Ink Composition F of Comparative Example 1 using the conventional dispersant and organic solvent, the dispersion average particle size of the pigment was rather large, grazing occurred in the printed layer-sliding test, and the printed layer was peeled from the printing medium. Furthermore, they had low anti-grazing properties when they were printed on the gloss paper sheet. The results were substantially the same when Pigmented Ink Composition G of Comparative Example 2 comprising the resin having no acidic group as a dispersant was used.

Although the resins having the acidic group were used, in Pigment Ink Composition H of Reference Example 1 in which the molecular weight of the resin was too small or Pigment Ink Composition I of Reference Example 2 in which the amount of the resin was too small, the dispersion average particle size of the pigment was large, the anti-grazing properties were low when the ink compositions were printed on the gloss paper sheet.

EFFECTS OF THE INVENTION

As described above, when the present invention is applied, it is possible to provide a pigmented ink composition having good anti-grazing properties, in particular, a pigmented ink composition for ink-jet printers, which contains a pigment with a small dispersion particle size and has good water resistance, can be printed on a plain paper sheet without cockling, and suffers from no grazing of printed records when the ink composition is printed on a cationically treated paper sheet.

The invention claimed is:

1. A pigmented ink composition comprising a pigment, a resin having an acidic group and an organic solvent having a boiling point of at least 150° C. which is present in an amount of from 50 to 90% by weight based on the whole weight of the ink composition, wherein said resin having an acidic group is a water-insoluble acrylic resin having a hydrophobic group and an acid value of 10 to 300 mg-KOH/g, and wherein said organic solvent is selected from the group consisting of a monoalkyl ether monoalkyl ester of (poly)alkylene glycol and a dialkyl ester of (poly)alkylene glycol.

2. The pigmented ink composition according to claim 1, which comprises 0.1 to 20% by weight of the pigment and 0.5 to 30% by weight of the resin having the acidic group based on the whole weight of the ink composition.

3. The pigmented ink composition according to claim 1, wherein said resin having the acidic group has a weight average molecular weight of $1 \times 10^4$ to $3 \times 10^5$, and a molecular weight distribution of 1.5 to 10.

4. The pigmented ink composition according to claim 1, wherein said resin having the acidic group is a resin having an ether bond.

5. The pigmented ink composition according to claim 1, wherein said organic solvent having a boiling point of at least 150° C. is at least one compound selected from the group consisting of ethylene glycol monoalkyl ether monoalkyl ester, diethylene glycol monoalkyl ether monoalkyl ester, triethylene glycol monoalkyl ether monoalkyl ester, propylene glycol monoalkyl ether monoalkyl ester, dipropylene glycol monoalkyl ether monoalkyl ester, tripropylene glycol monoalkyl ether monoalkyl ester, ethylene glycol dialkyl ester, diethylene glycol dialkyl ester, triethylene glycol dialkyl ester, propylene glycol dialkyl ester, dipropylene glycol dialkyl ester and tripropylene glycol dialkyl ester.

6. The pigmented ink composition according to claim 1, which is used in an ink-jet printer, wherein said ink composition has a surface tension of at least 25 mN/m at 20° C. and a viscosity of 2 to 30 cp at 20° C., and the pigment has a dispersion average particle size of 0.01 to 0.5 μm.

* * * * *